(12) United States Patent
Fujita et al.

(10) Patent No.: US 7,111,029 B2
(45) Date of Patent: Sep. 19, 2006

(54) RANDOM NUMBER GENERATING CIRCUIT

(75) Inventors: Shinobu Fujita, Kanagawa-ken (JP);
Ken Uchida, Kanagawa-ken (JP); Ryuji Ohba, Kanagawa-ken (JP); Junji Koga, Kanagawa-ken (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 594 days.

(21) Appl. No.: 10/235,827

(22) Filed: Sep. 6, 2002

(65) Prior Publication Data

US 2003/0061250 A1 Mar. 27, 2003

(30) Foreign Application Priority Data

Sep. 26, 2001 (JP) ............................. 2001-294836
Jun. 25, 2002 (JP) ............................. 2002-183967

(51) Int. Cl.
*G06F 1/02* (2006.01)
(52) U.S. Cl. .................................................. 708/250
(58) Field of Classification Search ................ 708/250, 708/251, 255
See application file for complete search history.

(56) References Cited

U.S. PATENT DOCUMENTS 5,365,122 A * 11/1994 Rackley ..................... 327/306
5,570,307 A   10/1996 Takahashi
5,963,104 A * 10/1999 Buer ............................ 331/78
6,480,072 B1 * 11/2002 Walsh et al. ................. 331/78
6,631,390 B1 * 10/2003 Epstein ....................... 708/250
6,697,829 B1 *  2/2004 Shilton ....................... 708/255

FOREIGN PATENT DOCUMENTS

JP     2001-166920     6/2001

OTHER PUBLICATIONS

U.S. Appl. No. 10/661,593, filed Sep. 15, 2003, Yasuda et al.

* cited by examiner

*Primary Examiner*—Chuong D. Ngo
(74) *Attorney, Agent, or Firm*—Oblon, Spivak, McClelland, Maier & Neustadt, P.C.

(57) ABSTRACT

A random number generating circuit can generate random numbers with high randomness, and can be made as a compact integrated circuit. The random number generating circuit includes an uncertain logic circuit having a flip-flop type logic circuit that gives digital output values not determined definitely by a digital input value, and an equalizing circuit having an exclusive OR operating circuit for equalizing appearance frequencies of "0" and "1" in the digital output values output from the uncertain logic circuit.

19 Claims, 17 Drawing Sheets

Estimated Output

RANDOM NUMBER GENERATING CIRCUIT

CROSS-REFERENCE TO RELATED APPLICATIONS

This application is based upon and claims the benefit of priority from the prior Japanese Patent Application No. 2001-294836, filed on Sep. 26, 2001, and the prior Japanese Patent Application No. 2002-183967, filed on Jun. 25, 2002; the entire contents of which are incorporated herein by reference.

BACKGROUND OF THE INVENTION

This invention relates to a random number generating circuit, and more particularly, to a random number generating circuit compactly constructible with a digital logic circuit, capable of generating random numbers with high randomness, and suitable for use in cryptographic algorithm.

Digital random numbers are used, for example, in simulation of a phenomenon accompanied by a probability process, and in a generation process of an identification number, a password and an encryption key for a cryptographic algorithm for a security purpose. As digital random numbers, conventional techniques have used pseudo digital numbers made by computation by CPU. Such pseudo random numbers are typically made by logic circuits called feedback shift registers.

On the other hand, a method of making random numbers by using noise generated in resistors or diodes has also been brought into practical use. In this method, unevenness or periodicity is removed from random numbers, and approximately "true random numbers" can be obtained. This type of random number generating circuit flows a constant current in an element of a noise source to generate noise, then supplies the noise to a high-pass filter circuit to extract AC components, then amplifies them in an analog circuit, and thereafter converts them to digital values by AD conversion. In this process, using a certain value as a threshold value, the method determines AC component in excess of the threshold value as "1" and AC components not reaching the threshold value as "0". Further, since the random number sequence obtained exhibits unevenness, it is used after correction by a digital circuit in most cases.

As already known, pseudo random numbers made by CPU become equal random numbers if the same number is initially given (seed), and since they undesirably have periodicity based on the number of registers, they are not adequate as random numbers. Especially for use in security, they have the possibility that the "encryption key" is broken.

On the other hand, the circuit of the type configured to amplify noise needs a large-scaled analog amplifier circuit and it is difficult for integration and miniaturization, because heat noise and shot noise of resistors and diodes are usually analog signals and their outputs are small. Especially, it is difficult to incorporate it in a compact device, such as IC card, for a cryptographic security function.

Therefore, a compact integrating circuit capable of generating high-quality random numbers without any periodicity is being demanded.

For miniaturization purpose, the circuit is preferably made in form of a digital circuit such as TTL or MOS, for example. Digital circuits, however, can only make random numbers by an algorismic process because they basically produce equal outputs in response to a certain input. Therefore, similarly to feedback shift registers, they can only make pseudo random numbers.

To overcome this inconsistency, it is necessary to make a digital circuit that produces uncertain outputs.

SUMMARY OF THE INVENTION

According to an embodiment of the invention, there is provided a random number generating circuit comprising: an uncertain logic circuit including a flip-flop type logic circuit which provides digital output values not definitely determined by a digital input value; and an equalizing circuit which equalizes appearance frequencies of "0" and "1" in said digital output values from said uncertain logic circuit.

BRIEF DESCRIPTION OF THE DRAWINGS

The present invention will be understood more fully from the detailed description given herebelow and from the accompanying drawings of the embodiments of the invention. However, the drawings are not intended to imply limitation of the invention to a specific embodiment, but are for explanation and understanding only.

In the drawings.

DETAILED DESCRIPTION OF THE INVENTION

Some embodiments of the invention will now be explained in detail with reference to the drawings.

Figure 1:
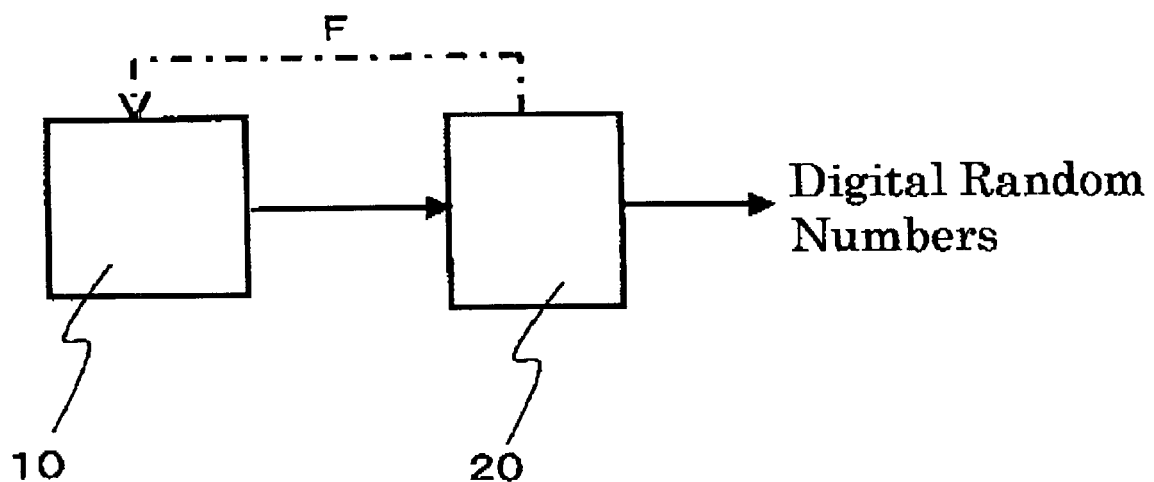
FIG. 1 is a block diagram that illustrates a configuration of the substantial part of a random number generating circuit according to an embodiment of the invention.

FIG. 1 is a block diagram that illustrates a configuration of the substantial part of a random number generating circuit according to an embodiment of the invention.

The random number generating circuit according to the embodiment includes an uncertain logic circuit 10 and an equalizing circuit 20 fed by the uncertain logic circuit 10.

The uncertain logic circuit 10 is a logic circuit in form of a digital circuit. Its principle is such that the output "0" or "1" is uncertain relative to a particular combination of input signals. When the logic output is uncertain, the output varies with time-to-time physical factors of component elements of the logic circuit 10. By using this physical phenomenon, it is possible to obtain a digital circuit whose output varies even with a constant input and to obtain a random sequence of digital signals "0" and "1".

Since the order of digital signals "0" and "1" in the sequence obtained by this method depends on properties of component elements of the digital circuit, "unevenness" is produced in the appearance frequency of "0" and "1".

Thus the equalizing circuit 20 carries out further digital processing of the digital signals to remove the unevenness and obtain digital random numbers with high randomness. Alternatively, as illustrated in FIG. 1 as the feedback loop F, the equalizing circuit 20 may be configured to supply the uncertain logic circuit 10 with a feedback signal based on the output date of the uncertain logic circuit 10 to remove the "unevenness" in the output data.

In this manner, the random number generating circuit can be made of a smaller number of logic gates, and therefore can be designed as a compact circuit. Additionally, the circuit for correcting frequencies of "0" and "1" can be formed as a relatively compact logic circuit.

Since the phenomenon as the source of random numbers is based on a physical phenomenon of each component element of the uncertain logic circuit 10, uncertain outputs are obtained can be obtained in response to equal inputs. Therefore, the random number sequence does not exhibit a periodicity, and high-quality random numbers different from pseudo random numbers permitting estimation of random numbers can be obtained.

Hereinbelow, embodiments of the invention will be explained in greater detail with reference to specific examples.

FIRST EMBODIMENT

Figure 2:
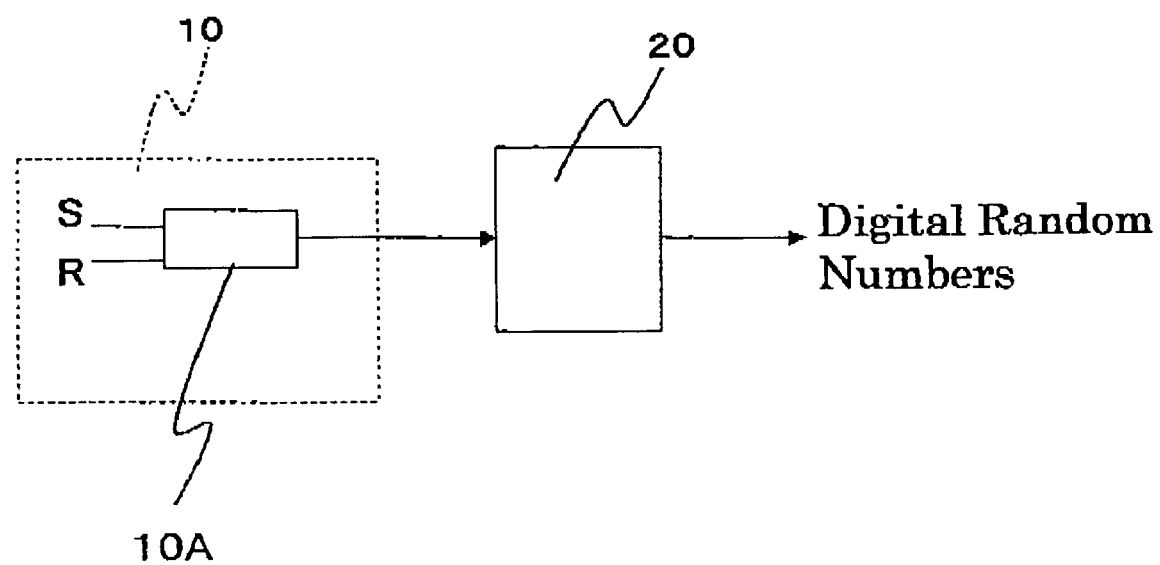
FIG. 2 is a schematic diagram that illustrates the basic configuration of a random number generating circuit according to an embodiment of the invention.

FIG. 2 is a schematic diagram that illustrates the basic configuration of a random number generating circuit according to an embodiment of the invention.

The random number generating circuit shown here includes an RS(reset-set)-type flip-flop (RS-FF) 10A in the uncertain logic circuit 10.

Figure 3:
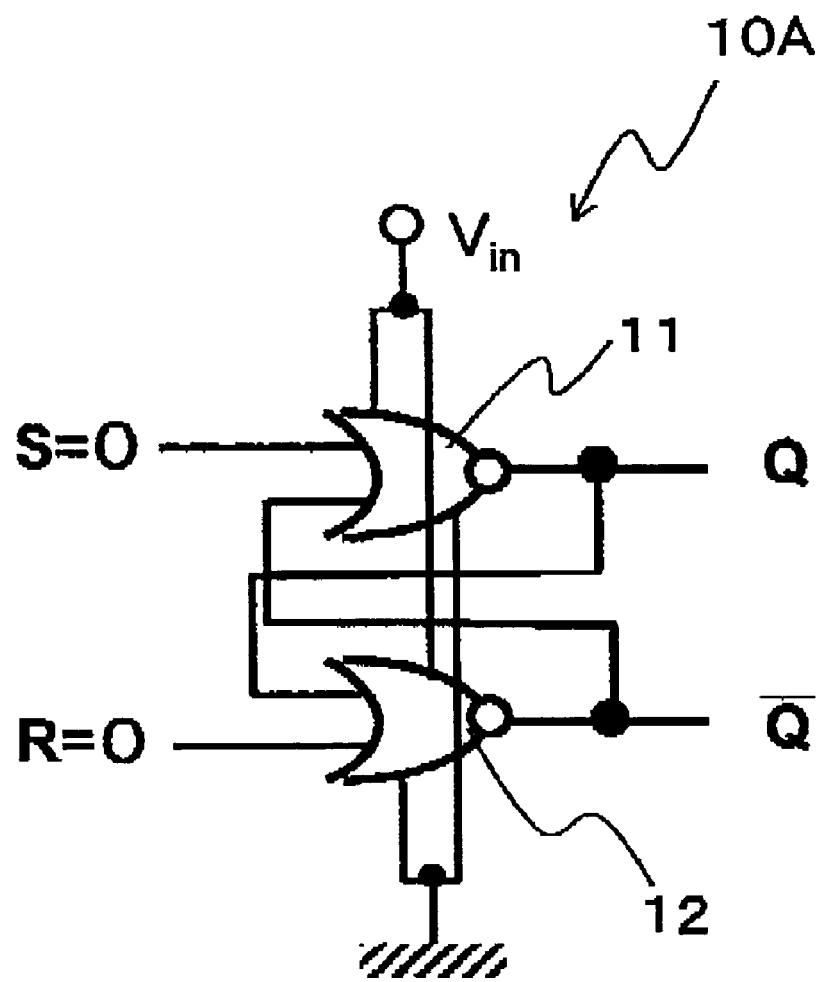
FIG. 3 is a schematic diagram that illustrates a specific configuration of RS-FF 10A used in the first embodiment of the invention.

FIG. 3 is a schematic diagram that illustrates a specific configuration of RS-FF 10A used in the first embodiment of the invention. As illustrated, RS-FF 10A is a combination of two NOR logic circuits 11, 12.

In case the input is S=R=0, the corresponding output Q is the same value as the preceding output Q of the flip-flop. However, if the power-OFF state is the preceding state, then the output after subsequent power-ON becomes uncertain. When S=R=0 is actually input, the output is determined as "0" or "1", depending on a delicate difference between turn-ON timings of a plurality of CMOSs forming the NOR circuits 11, 12. Delicate difference of characteristics is not always constant, and it is rather determined by the temperature of the peripheral part of the circuit, small noise physically generated in the circuit, etc. Therefore, the output is not constant as well.

Figure 4:
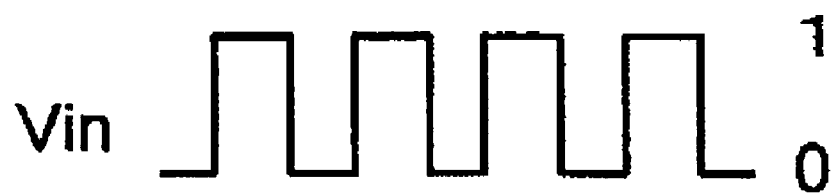
FIG. 4 is a diagram that shows pulses indicative of operation of RS-FF.
Figure 4:
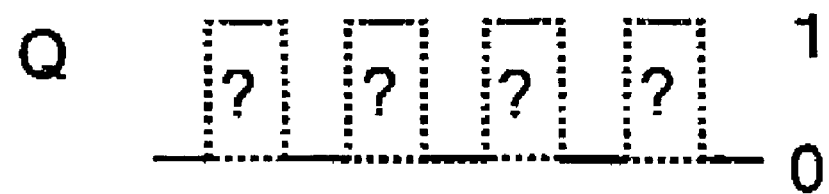

FIG. 4 is a diagram that shows pulses indicative of operation of RS-FF.

Assume here that ON and OFF of the power voltage Vcc(Vin) of the NOR circuits 11, 12 ON and OFF in a pulsating manner while maintaining S=R=0 are inputs "0" and "1", respectively. If the output of the flip-flop is made uncertain by inputting "1" after inputting "0" for a duration of time enough to completely erase information of the flip-flop, then an uncertain output Q is obtained in response to the input "1". Therefore, by repeating "0" and "1" as inputs, an uncertain and random sequence of numerical values of "0" or "1" can be obtained as the output Q as shown in FIG. 4.

However, since the transistors forming the logic circuits 11, 12 are not absolutely symmetric, appearance frequency of "0" and that of "1" are not equivalent, and one of them appears more frequently than the other. Therefore, as explained later, the circuit 20 for equalizing "0" and "1" in appearance frequency is combined to obtain the random number generating circuit according to the instant embodiment.

There is a method of generating digital random numbers by using a digital circuit having an arrangement of inverters. This method uses temperature fluctuation of elements added to the digital circuit as disclosed in, for example, Japanese Patent Laid-Open Publication No. 2001-166920. In this prior art, however, the oscillation frequency of a ring oscillator made by annularly connecting an odd number of inverters is made unstable with temperature, and this is absolutely different from the present invention. Further, this prior art needs a complicated entire configuration and a large circuit size, and there is room for improvement also in this respect. Furthermore, in case of positive feedback type oscillator circuits such as ring oscillators, the trigger for starting oscillation is a noise signal synchronous with the basic clock of the circuit, and the oscillator circuit and the clock cannot be absolutely asynchronous. Therefore, a periodicity appears in the random number sequence generated and it degrades the randomness of the random numbers.

In contrast, the embodiment of the invention can efficiently obtain a random digital signal sequence with a much more compact circuit by positively creating uncertain outputs of the flip-flop.

Figure 5:
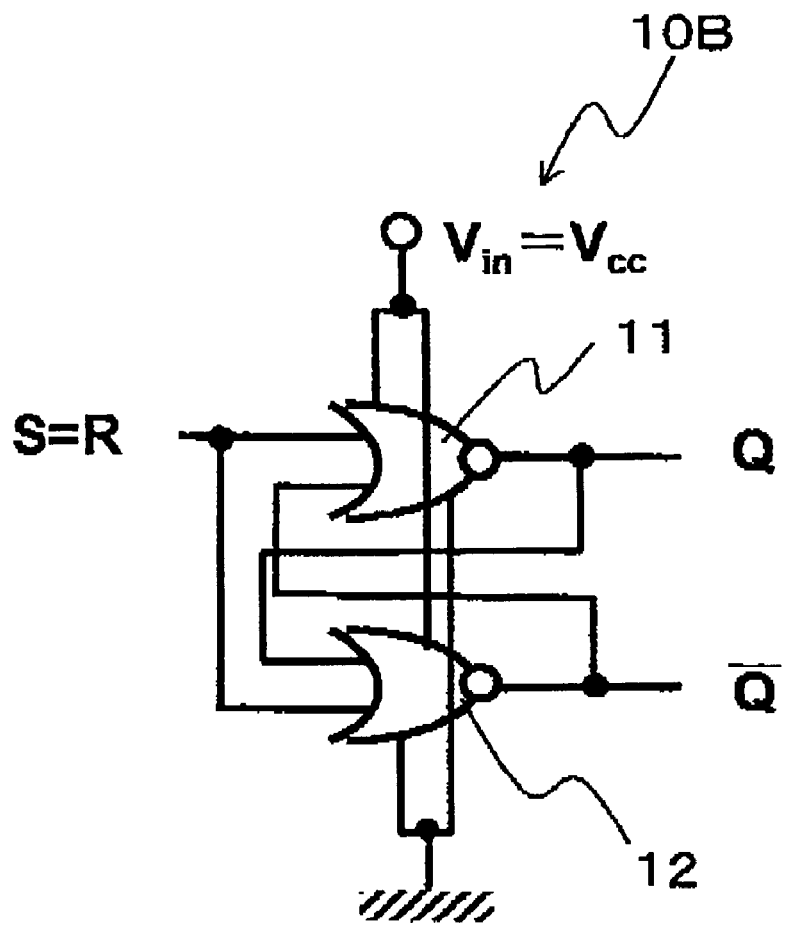
FIG. 5 is a schematic diagram that shows another specific example of RS-FF having two NOR logic circuits 11, 12 connected thereto.

In case of using an RS type flip-flop in the instant embodiment, uncertain outputs can be obtained in a manner different from that of the above-explained specific example by connecting two NOR logic circuits 11, 12 as shown in FIG. 5.

Figure 6:
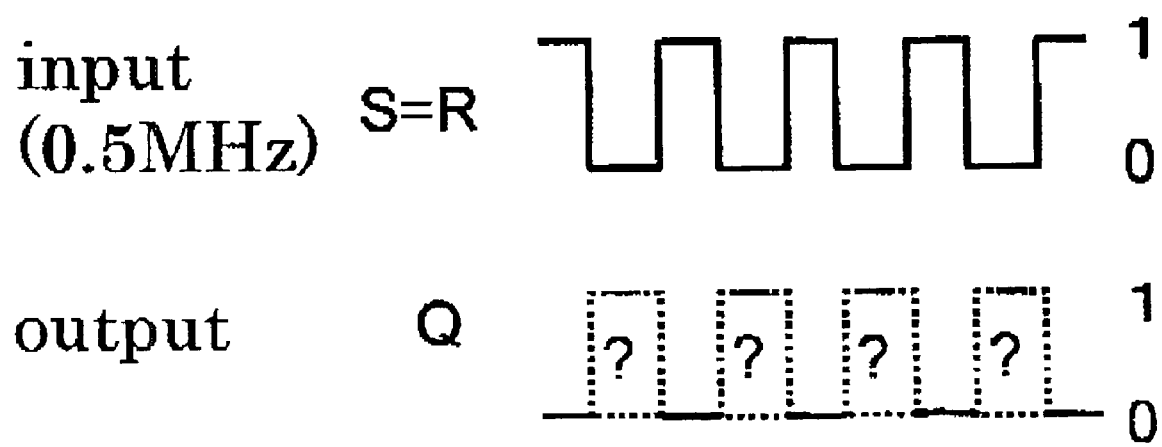
FIG. 6 is a diagram that shows pulses for explaining operation of RS-FF shown in FIG. 5.

FIG. 6 is a diagram that shows pulses for explaining its operation.

In this case, while holding the source Vcc ON as per usual and using S=R as the input, "1" and "0" are alternately input as shown in FIG. 6. In case of S=R=0, the output Q maintains Q of the preceding state aid the output /Q (indicating inverted Q) maintans Q of the preceding state so that they take "0" or "1", respectively.

In case of S=R=1, however, Q and /Q become equally Q=0 and /Q=0. Therefore, when the input next becomes S=R=0, it is uncertain whether 1 or 0 appears as Q. As a result, an uncertain digital signal sequence as shown in FIG. 6 is obtained.

However, also in the digital signal sequence obtained here, the appearance frequencies of "0" and "1" are not equivalent in most cases. Thus, the circuit 20 for equalizing appearance frequencies of "0" and "1" is combined to obtain the random number generating circuit according to the embodiment of the invention.

The uncertain logic circuit 10 in the random number generating circuit according to the embodiment may be configured differently from the specific example shown in FIGS. 2 through 6 by using other types of flip-flops to similarly make up a random number generating circuit. That is, by setting the clock input to "0" in case of a D-type flip-flop, setting it to J=K=1 or 0 in case of a JK flip-flop or setting the input T to an arbitrary value in case of a T type, the output becomes uncertain when the initial value of the flip-flop is not determined.

SECOND EMBODIMENT

Next explained is the second embodiment of the invention.

Figure 7:
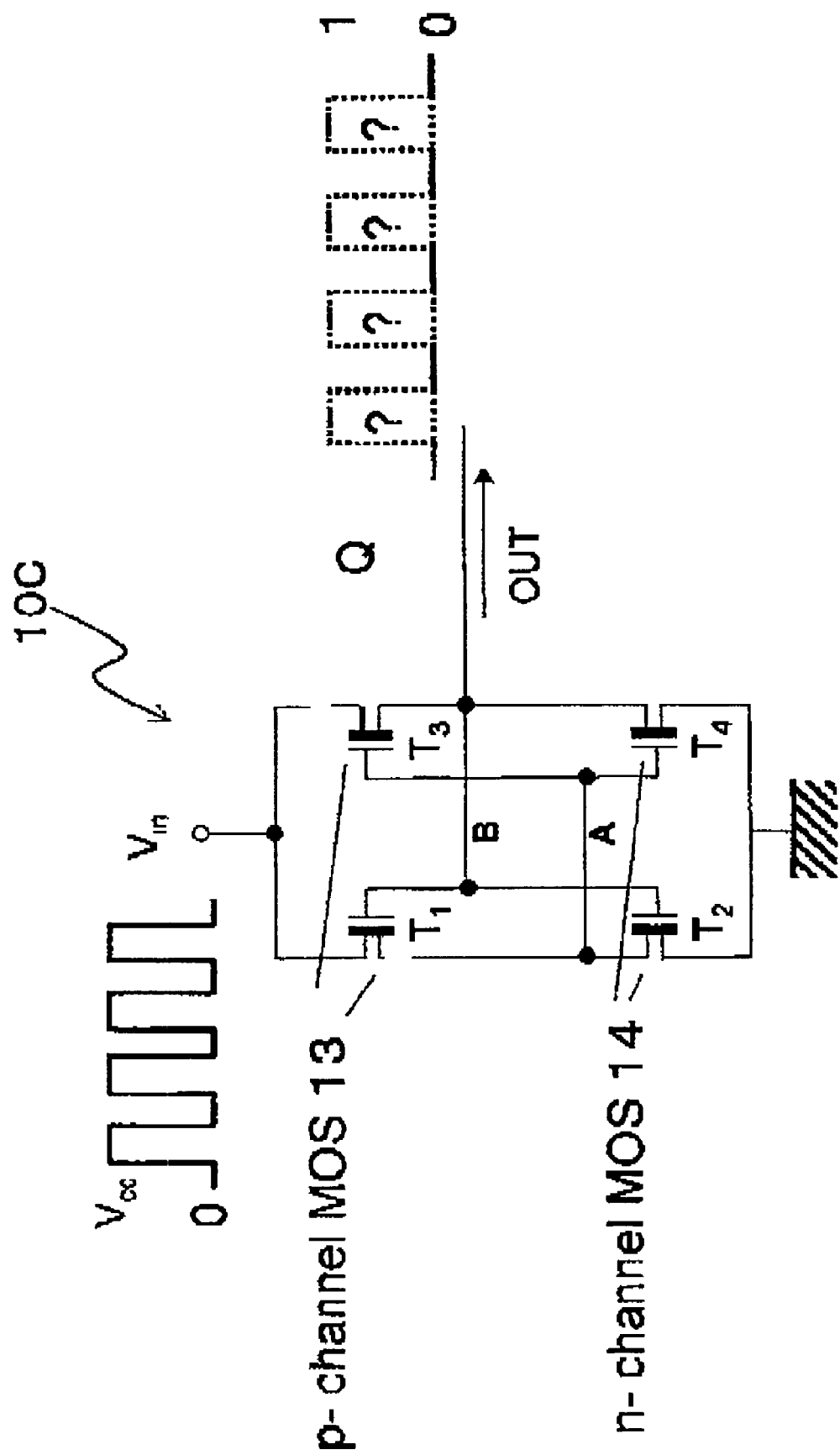
FIG. 7 is a schematic diagram that shows the substantial part of an uncertain logic circuit 10 of a random number generating circuit according to an embodiment of the invention.

FIG. 7 is a schematic diagram that shows the substantial part of an uncertain logic circuit 10 of a random number generating circuit according to this embodiment.

In this embodiment, the uncertain logic circuit includes a flip-flop circuit 10C having an arrangement of two CMOS circuits 13, 14 and connecting their gates and CMOS transistors. In this flip-flop, when the MOS transistor T1 turns ON, the MOS transistor T3 turns OFF.

FIG. 8 is a schematic diagram that illustrates operation of the flip-flop circuit shown here.

When the power is OFF, all of the transistors are OFF, and potentials of all electrodes are equal to the ground potential.

When Vin is set to 1 (H: High), since the potential of the gate of each transistor is 0 (L: Low), transistor T1 and transistor T3 can turn ON. However, since the circuit is a flip-flop, only one of them turns ON.

Figure 8A:
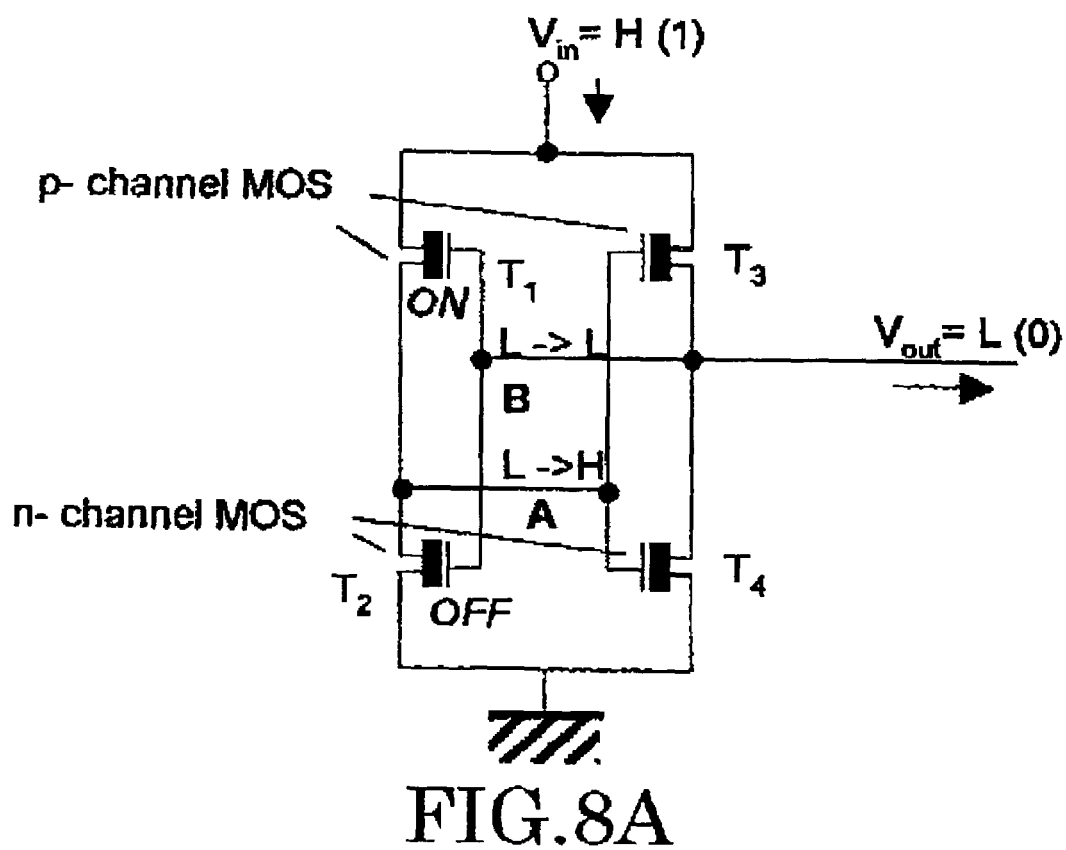
FIGS. 8A and 8B are schematic diagrams that illustrate operation of a flip-flop circuit according to an embodiment of the invention.

Assume here that the transistor T1 first turns ON as shown in FIG. 8A. Then the source and the drain of the transistor T1 become conductive and are equalized in potential, and the potential at the point A becomes the same High level as Vin. As a result, the transistor T3 turn OFF and the transistor T4 turn ON to stabilize the circuit. At the time, the potential at the point B, i.e. at the output, remains Low (0), which is the initial level.

Figure 8B:
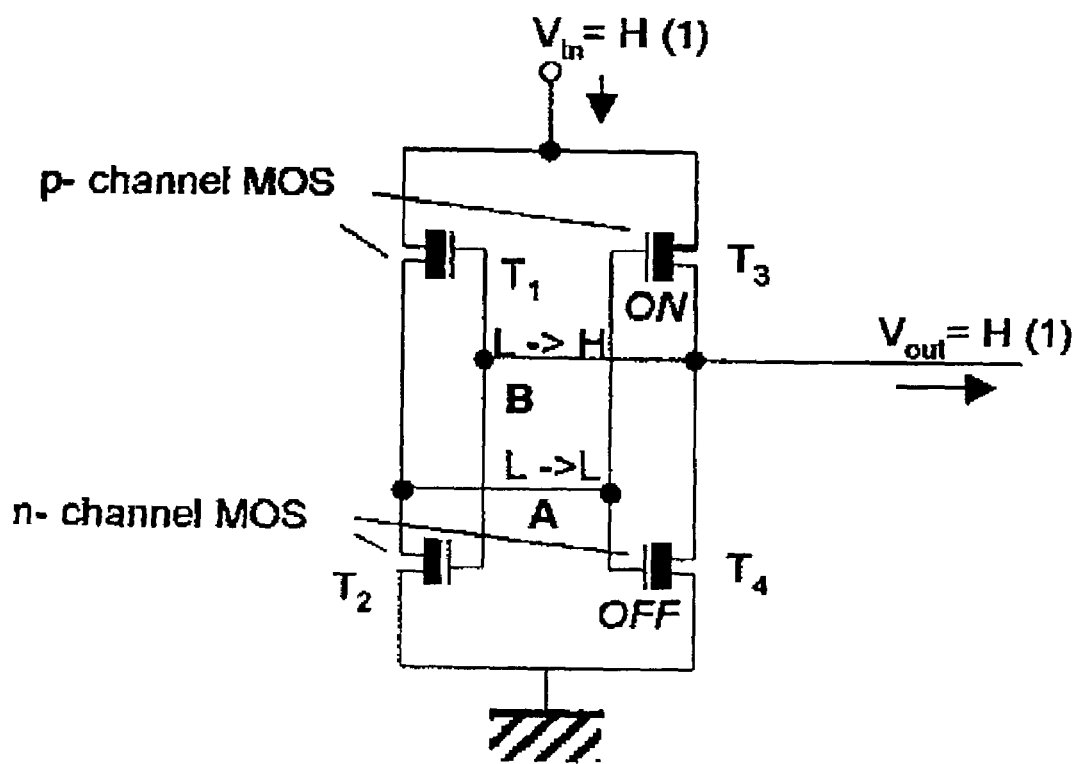

In contrast, assume that the transistor T3 first turns ON. Then the circuit appears as shown in FIG. 8B, and the output becomes High (1).

As such, the output is determined depending on which of the transistors T1 and T3 turns ON earlier. It is uncertain which transistor turns ON earlier, and the circuit functions as a flip-flop whose output is uncertain similarly to the first embodiment already explained. When ON and OFF actions of the power source of the flip-flop are used as digital inputs "0" and "1", respectively, the circuit issues an uncertain output, which may be "0" or "1", in response to the input "1".

However, two CMOSs are not absolutely equal in property, there is unevenness regarding which of T1 and T3 turns ON earlier However, by correcting it with the equalizing circuit 20 as explained later in greater detail, digital numbers with high randomness can be obtained.

THIRD EMBODIMENT

Next explained is a specific example of the equalizing circuit 20 in detail as the third embodiment of the invention.

In the first and second embodiment already explained, the flip-flop circuit is used as one form of the uncertain logic circuit 10. However, as already explained, the digital signal sequence obtained in any of these flip-flop circuits has certain "unevenness" in the appearance frequency of "0" and "1". That is, the appearance frequency is not equal between "0" and "1". The equalizing circuit 20 carries out a digital processing for correcting the "unevenness".

Figure 9:
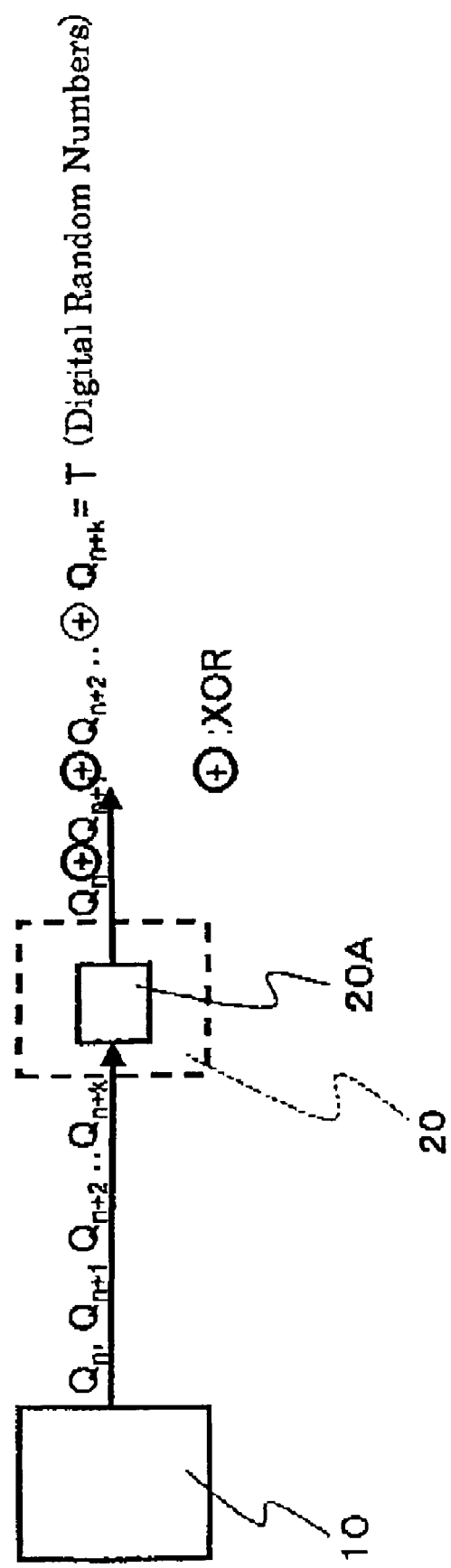
FIG. 9 is a diagram for explaining a concept of operation of an equalizing circuit in an embodiment of the invention.

FIG. 9 is a diagram for explaining a concept of operation of the equalizing circuit according to the instant embodiment.

As illustrated here, putting time-sequential outputs of the uncertain logic circuit 10 as Qn, . . . Qn+k, XOR (exclusive OR) logical operation is carried out on these k+1 data. Let its result be T. In the output of the uncertain logic circuit 10, the probability that T becomes 1 is:

$$0.5+0.5\times(1-2p)^{k-1}$$

where the appearance probability of "1" is p and the appearance probability of "0" is 1−p. As k increases, the probability approaches 0.5, and the unevenness is corrected.

In RS-FF actually prepared in accordance with the first embodiment, the "unevenness" was as large as approximately p=0.1. In case of k=10, the probability that T becomes 1 is 0.543. In case of k=20, it is 0.505, and in case of k=30, it is 0.50. That is, the probability approaches 0.5, and the "unevenness" disappears.

Under large values of k, the speed of generating random numbers decreases. However, if the period of turning the power ON and OFF is 30 MHz, the digital random number sequence can be generated at a speed around 1 Mbit/second even under k=30. Therefore, the problem of the speed is practically immaterial in most cases. If XOR operation is carried out by shifting one by one as XOR of Qn, . . . Qn+k, XOR of Qn+1, . . . Qn+(k+1), XOR of Qn+2, . . . Qn+(k+2), and so on, the speed of generating random numbers does not decrease.

The random number sequence data obtained in this manner may be used as the seed of a feedback shift register.

Further, by using the method explained below, the appearance probabilities of "0" and "1" can be equalized easily.

That is, when the probability that the digital signal P becomes "1" is p, and the probability that the digital signal Q becomes "1" is q, the difference between the probability that XOR operation value T of P and Q becomes "1" and the probability that is becomes "0" is expressed as follows.

$$4(0.5-p)(0.5-q) \qquad (1)$$

Therefore, if the probability that becomes "1" is 0.5, then the appearance probability of "0" and that of "1" of the XOR operation value T of P and Q are equal even when the probability that Q becomes "1" is not 0.5.

Figure 10:
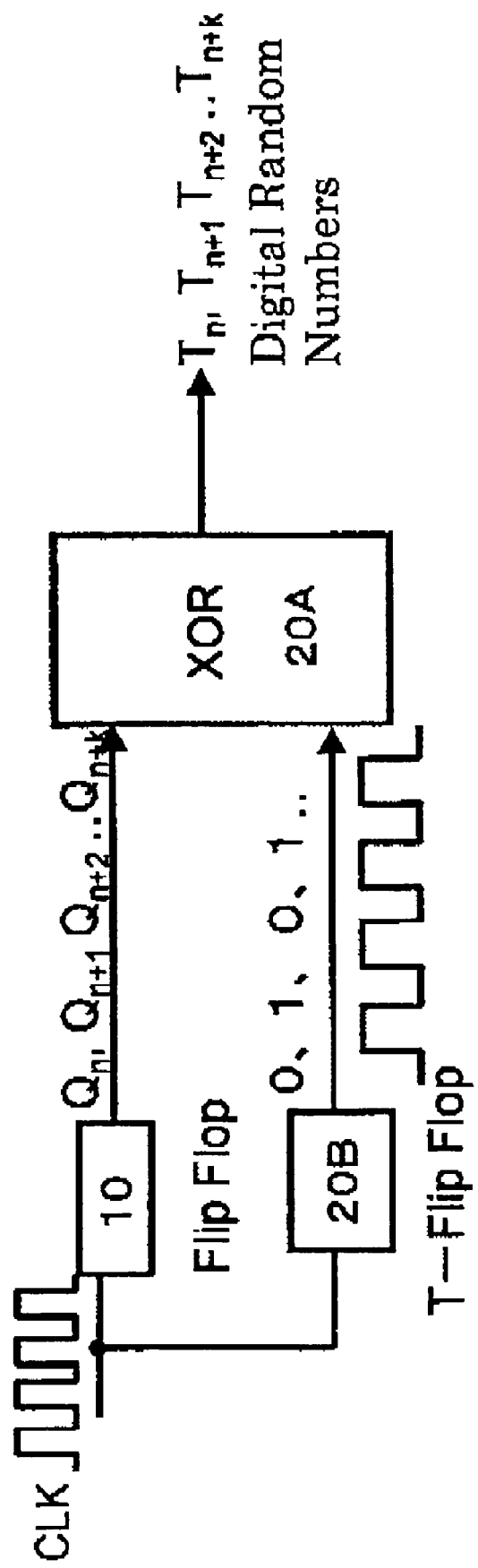
FIG. 10 is a schematic diagram that shows another specific example of the equalizing circuit.

If the input signal to the flip-flip 10 is branched and input to the T-type flip-flop 20B as shown in FIG. 10, then a signal doubled in period is obtained. In this signal "0" and "1" alternately appear at the same timing as the outputs of the flip-flop 10. As a matter of course, the appearance ratios of "0" and "1" in this signal are equal. Therefore, in the XOR operation output T of this signal and the signals of the flip-flop 10, "0" and "1" are equal in appearance probability, and the output can be used as a digital random number sequence with high randomness.

Figure 11:
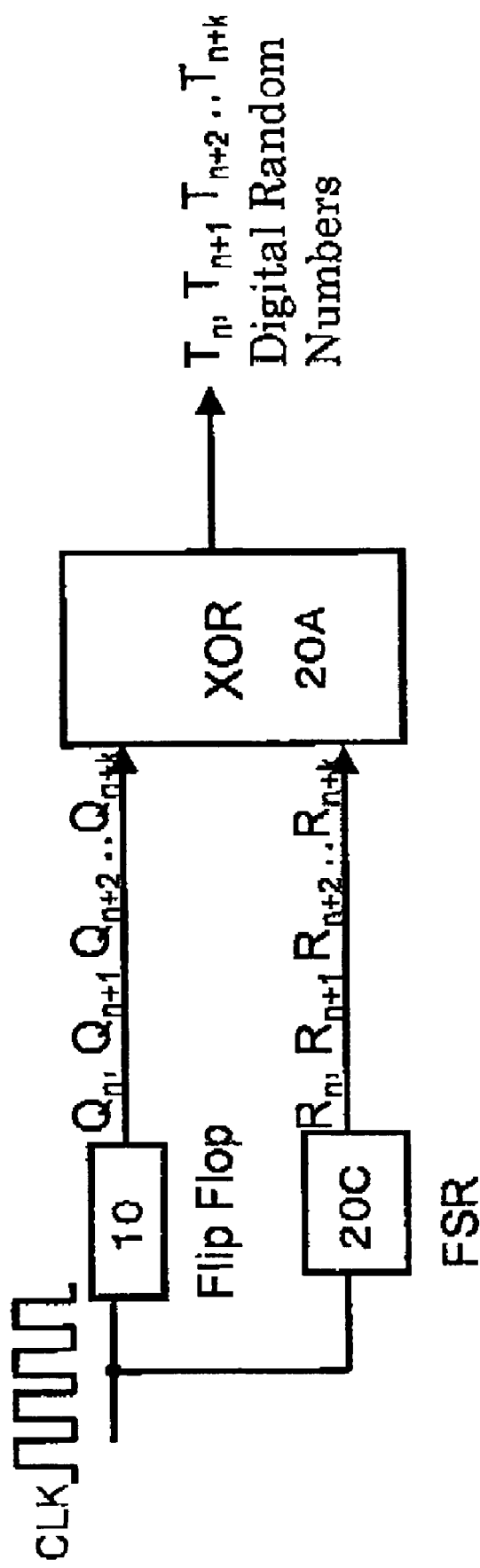
FIG. 11 is a schematic diagram that shows another specific example of the equalizing circuit.

The pseudo-random numbers R created by the feedback shift register (FSR) 20C shown in FIG. 11 using the same clock as that of the flip-flop 10 equally include "0" and "1". Therefore, in the XOR operation value T of these pseudo-random numbers R and outputs of the flip-flop 10, "0" and "1" are equal in appearance ratio, and it can be used as a digital random number sequence with high randomness.

Another specific example is shown as a configuration using two flip-flops.

Figure 12:
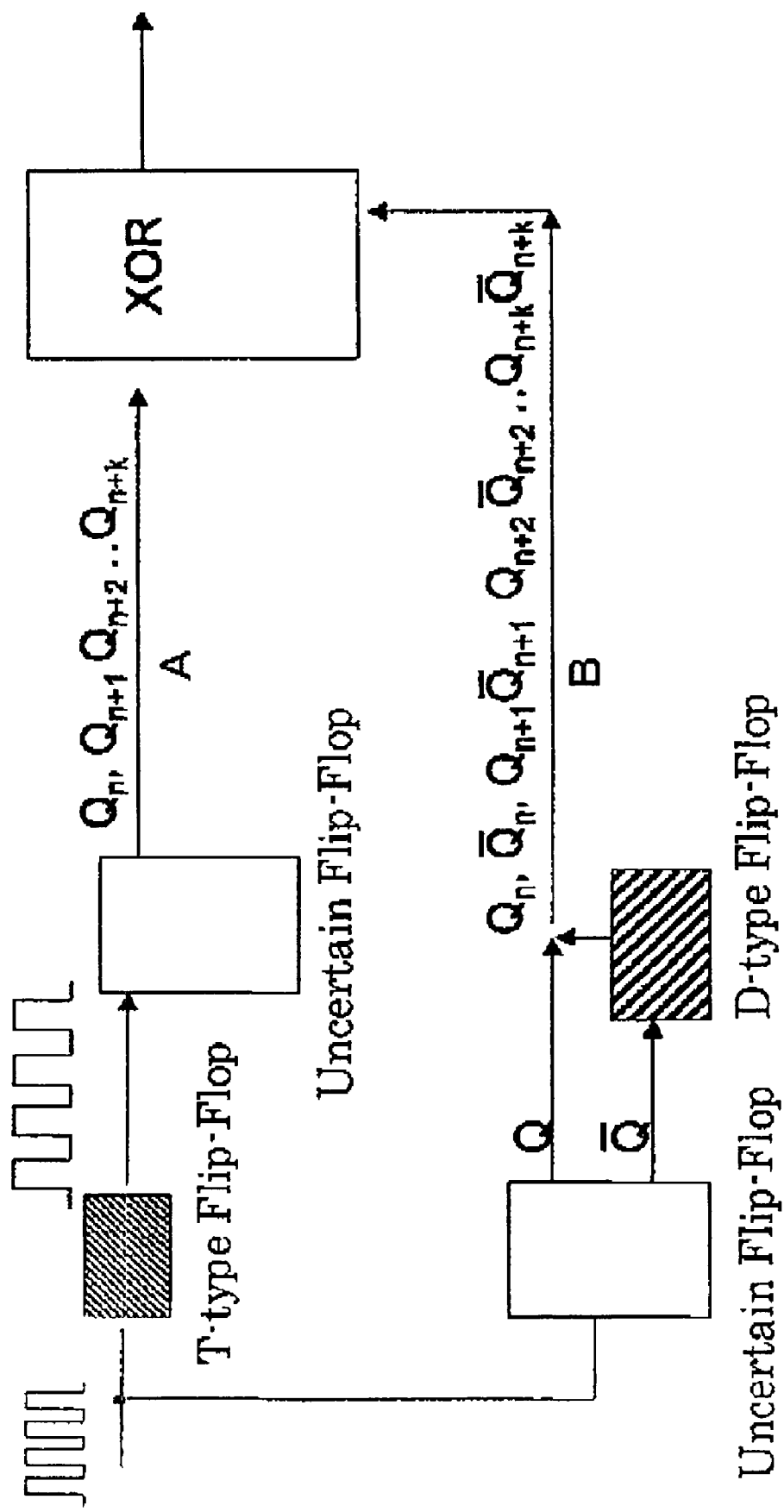
FIG. 12 is a schematic diagram that shows another specific example that makes use of two flip-flops.

FIG. 12 is a schematic diagram that shows this specific example. That is, outputs doubled in period from a T-type flip-flop and outputs equalized by a D-type flip-flop are operated by an XOR circuit.

In this case, two unstable flip-flop circuits are used. First, the reference clock signal is divided into two, and one of them is supplied to one of the uncertain flip-flop circuit after being changed in period into 1/2 through the t-type flip-flop. Then an uncertain random signal A having the 1/2 period of the reference clock is obtained. In this signal A, however, "0" and "1" are uneven in appearance ratio.

The other of the divided reference clock signal is supplied to the other uncertain flip-flop circuit to obtain the uncertain output Q and the inverted Q. When A and inverted Q are alternately output after the inverted Q is delayed by one reference clock through the D-type flip-flop, this signal becomes a random signal B in which "0" and "1" are arranged by 50% each. However, since Q and inverted Q appear alternately, there is a kind of regularity at that time. By XOR operation of the random signal A and the random signal B thus obtained, random numbers in which 0 and 1 evenly appear can be obtained because of the same principle as that of two examples shown above.

FOURTH EMBODIMENT

Next explained is a random number generating circuit configured to monitor outputs of the uncertain logic circuit and feed them back as the fourth embodiment of the invention.

Figure 13:
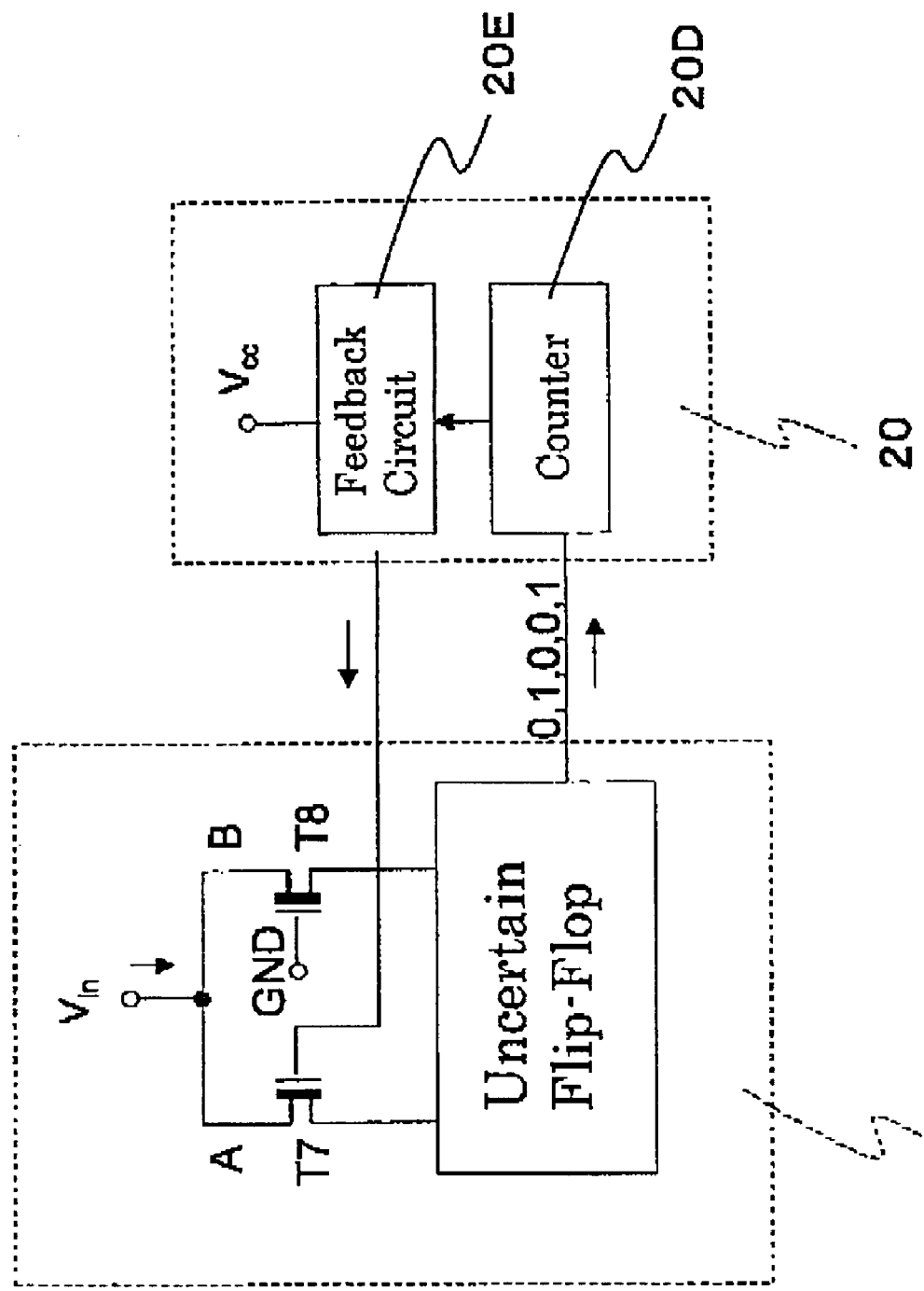
FIG. 13 is a schematic diagram that shows a configuration of the substantial part of a random number generating circuit according to an embodiment of the invention.

FIG. 13 is a schematic diagram that shows a configuration of the substantial part of the random number generating circuit according to this embodiment.

In this embodiment, the equalizing circuit 20 feeds back to the input of the uncertain flip-flop explained in FIG. 7. This feedback approximately equalizes the appearance ratios of "0" and "1" of the uncertain flip-flop.

More specifically, still in FIG. 13, assume that the output of the flip-flop becomes "0" when the A-side transistor T7 turns ON earlier. As illustrated here, N-channel MOS transistors T7 and T8 equal in designed specification are connected between the feedback circuit 20E and the power source input Vin, and the gate potential of the B-side transistor T8 is set to the ground potential beforehand.

Outputs of the flip-flop are counted by the digital counter 20D beforehand, and a potential proportional to the difference between counted "0" and "1" is applied to the gate of the A-side MOS transistor T7. In case that "1" is more frequent in the outputs, if the gate voltage of the A-side transistor T7 is slightly shifted to the plus side to relatively lower the channel resistance and facilitate the current flow to the A-side, then the A-side preferentially operates, and "0" increases in the outputs.

In contrast, in case that "0" is more frequent in the outputs, the gate voltage of the A-side transistor T7 is shifted to the minus side to increase the channel resistance.

This manner of feedback results in reducing the difference of appearance between "0" and "1" in the flip-flop outputs. Thus, it is also possible to directly use the outputs as random numbers.

Further, as explained as the third embodiment, the logic circuit capable of removing the "unevenness" may be combined to further reduce the "unevenness" in the random numbers. In this case, the number of data k for the above-explained XOR may be fewer, and the speed of generating random numbers can be enhanced.

FIFTH EMBODIMENT

Next explained is the fifth embodiment of the invention configured to reduce the unevenness of "0" and "1" in outputs by increasing the number of NOR circuits (or NAND circuits) forming the flip-flop in the uncertain logic circuit 10.

In case semiconductor circuits are manufactured in mass production, extreme unevenness may appear in part of the outputs due to uneven characteristics on the wafer. For example, it is possible that circuits having the appearance frequency of "0" near 100% appear in part of the entirety. Extreme unevenness of outputs disables quality improvement of random numbers even by correction with a smoothing circuit, and such circuits are defective as random number generating circuits. The instant embodiment is suitable for diminishing appearance of such defective circuits.

Figure 14A:
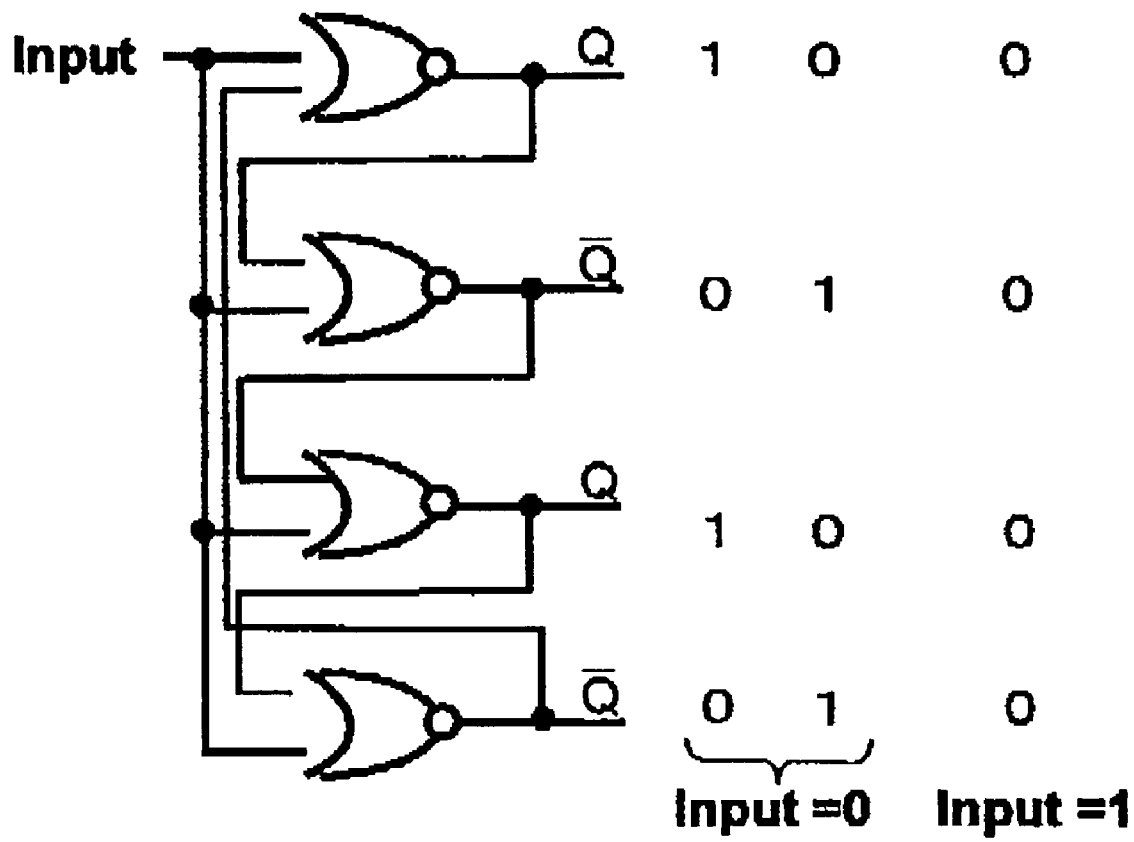
FIGS. 14A and 14B are schematic diagrams that show a concept of configuration of the fifth embodiment of the invention.
Figure 14B:
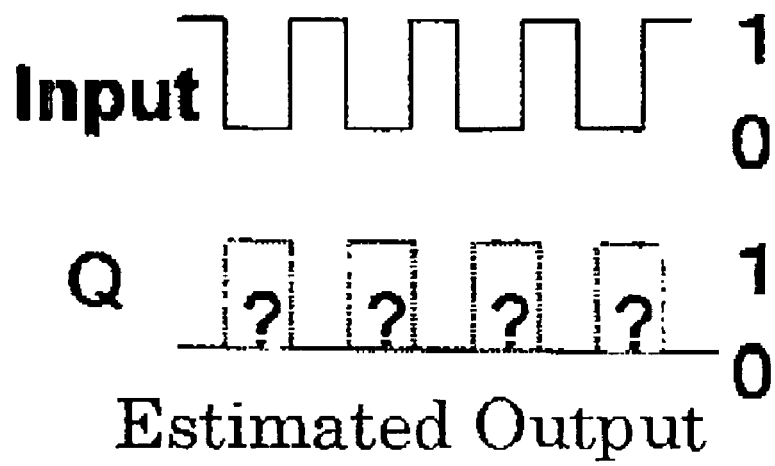

FIG. 14 is a schematic diagram that shows a concept of configuration of this embodiment. This embodiment uses an even number of flip-flops. That is, if a number of (an even number of) NOR circuits (or NAND circuits) are aligned in chain connection as shown in FIG. 14 such that the output of each NOR circuit is common to one of inputs of the next NOR circuit, the same operation as that of the uncertain flip-flop is realized.

That is, in case the input is "1", the circuit is stable when all outputs of flip-flops are "0". In other words, the input "1" can be regarded as a reset (R) signal. If the input is changed to "0", the NOR circuit becomes equivalent to an inverter, and it is stable when "1" and "0" appear alternately. That is, the input "0" can be regarded as a set (S) signal. Whether the outputs from the NOR circuits appear in the sequence of "0", "1", "0" and "1" or in the sequence of "1", "0", "1" and "0" depends on the w state maintained. However, since the outputs in the preceding state (the state responsive to application of "1" as the input) are "0", "0", "0" and "0", it is uncertain which of the sequences of "0" and "1" actually appears.

In this case, since a number of NOR circuits coexist, unevenness of the outputs is smaller than the configuration in which the flip-flop is made up of two NOR circuits. Needless to say, as NOR circuits increase, unevenness of the outputs is smaller.

In case of this specific example, outputs of odd-numbered NOR circuits are principally equal in value with each other, and outputs of even-numbered NOR circuits are also principally equal in value with each other. Even-numbered or odd-numbered outputs may be combined with the aforementioned equalizing circuit to obtain random numbers with higher quality.

Next explained is the second specific example of the instant embodiment, which is configured to introduce a signal from an oscillator circuit to an even number of flip-flops.

Figure 15A:
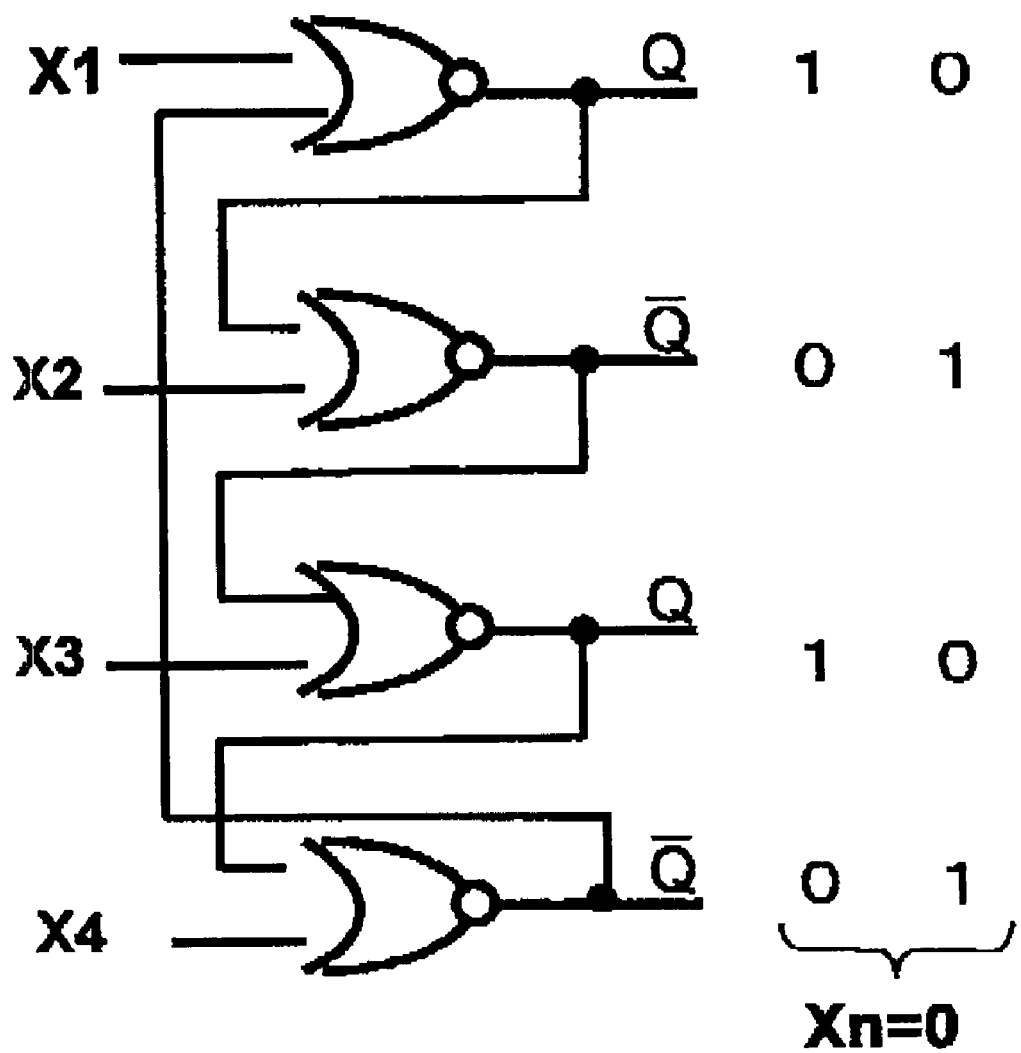
FIGS. 15A and 15B are schematic diagrams that illustrate a configuration of the substantial part of a specific example of the fifth embodiment of the invention.
Figure 15B:
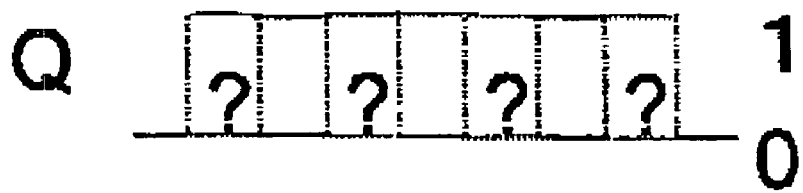

FIGS. 15A and 15B are schematic diagrams that illustrate a configuration of the substantial part of this specific example. As illustrated in FIG. 15A, a large even number of NOR circuits (or NAND circuits) are aligned to form an uncertain flip-flop, and independent inputs are used for respective NOR circuits. Then, "0", or "1", and "0" are alternately introduced to each NOR circuit. This increases the factors for randomness and contributes to creating high-quality random numbers.

This principle is explained below, taking a configuration using four NOR circuits as shown in FIGS. 15A and 15B. If combinations of inputs and outputs to respective NOR circuits are expressed by (X1, X2, X3, X4: Q1, Q2, Q3, Q4) for convenience, they are as follows, for example.

(1, 0, 0, 0: 0, 1, 0, 1)
(1, 1, 0, 0: 0, 0, 1, 0)
(1, 0, 1, 0: 0, 1, 0, 1)
(1, 0, 0, 1: 0, 1, 0, 0)
(1, 1, 1, 0: 0, 0, 0, 1)

In case that "0" and "1" do not alternately align in the outputs Q1 through Q4, if "0" is input as all inputs X, then all NOR circuits become equivalent to inverters. Therefore, X and Q become (0, 0, 0, 0: 0, 1, 0, 1)
or (0, 0, 0, 0: 1, 0, 1, 0)

Figure 16:
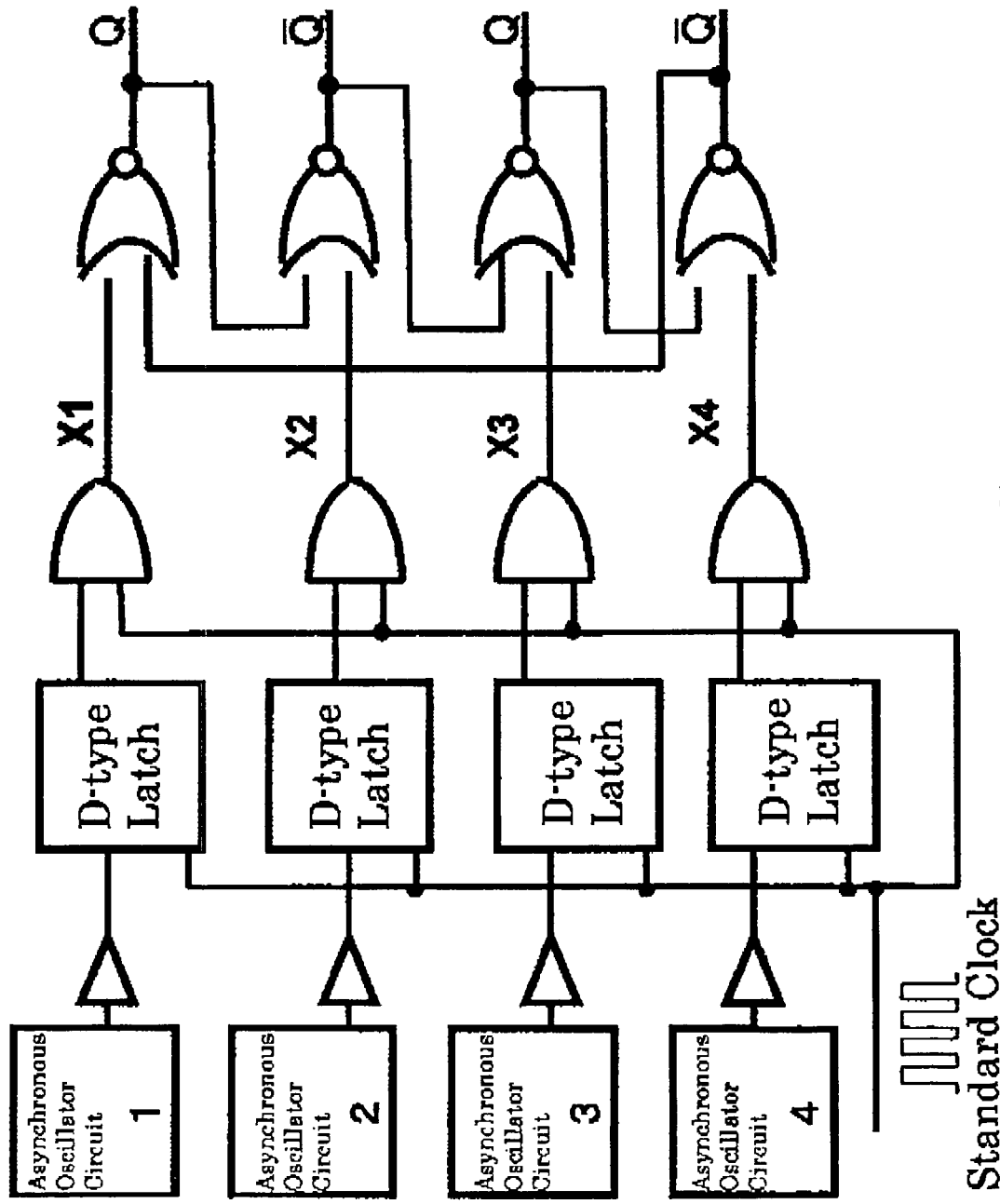
FIG. 16 is a schematic diagram that shows a configuration using asynchronous oscillator circuits different in frequency as a method of random input.

In this case, it is uncertain which sequence actually appears. If the input X has randomness, its interactive effect with the randomness of the uncertain flip-flop enhances the quality of the random numbers. As a method for random input, it is effective to use asynchronous oscillator circuits different in frequency as illustrated in FIG. 16.

More specifically, asynchronous oscillator circuits and D-type latches are provided in association with respective NOR circuits. The asynchronous oscillator circuits preferably include buffers at their output ends such that their outputs are converted to "0" or "1". However, if their outputs are digitized such as multivibrators, they need not include buffers. Outputs from the asynchronous oscillator circuits are latched in sync with the standard clock, and by operating AND of the latched signals and the clock, a signal in which "0", or "1", and "0" alternately appear is obtained. If such signals are used as inputs X, the flip-flop alternately outputs "0" as the certain value and "0" or "1" as the uncertain value as shown in FIG. 15B. Thus by extracting uncertain values, digital random numbers can be obtained.

Note here that random numbers cannot be made only by processing independent inputs X1 through X4 with a logic circuit giving appropriate certain outputs. Even though the respective inputs X are asynchronous, they exhibit a periodicity. Therefore, by merely combining them in the logic circuit, the periodicity always appears in the output, and high-quality random numbers are not usually obtained. High-quality random numbers are obtained only through the uncertain flip-flop.

Figure 17:
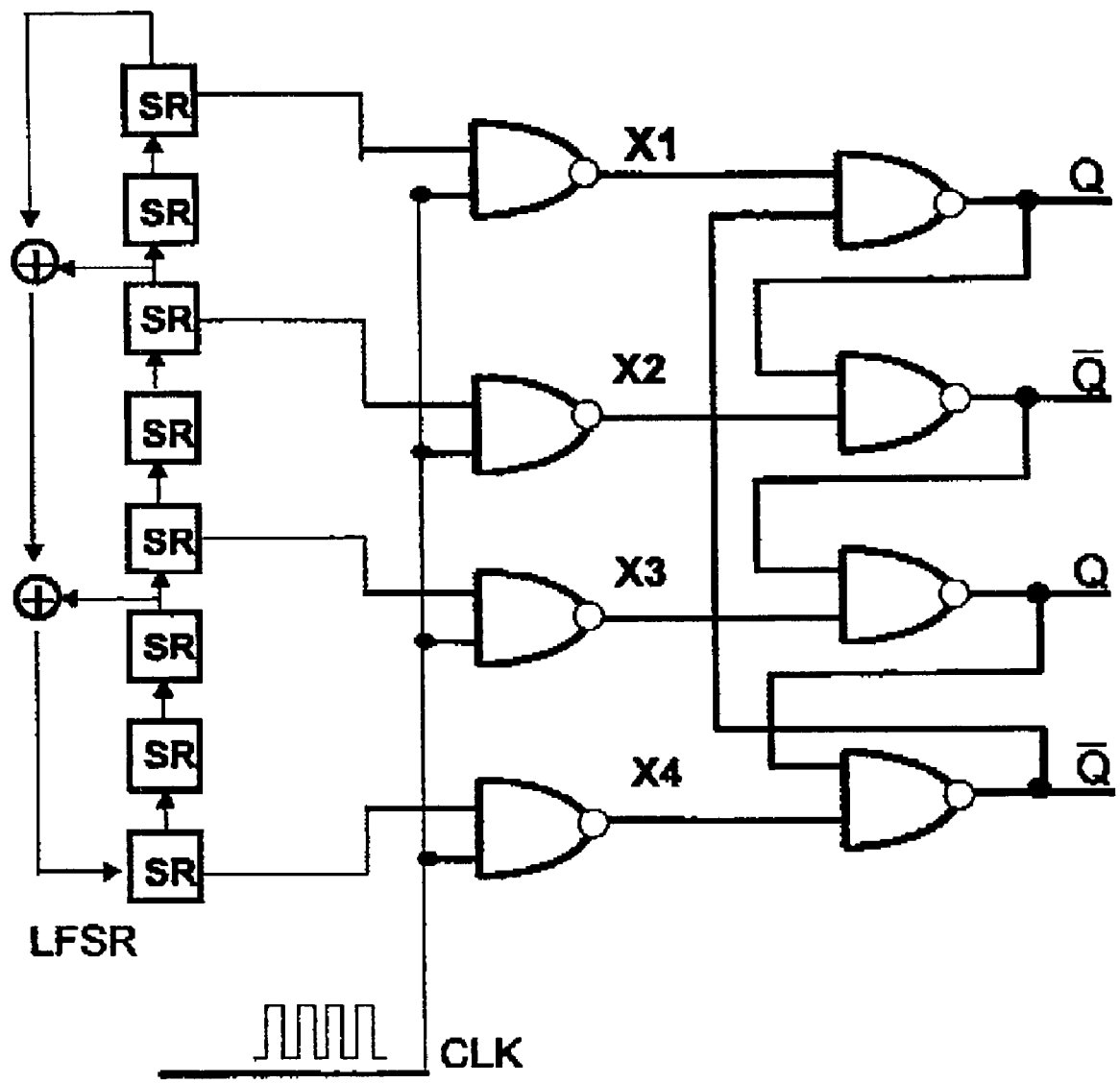
FIG. 17 is a schematic diagram that shows a configuration using LFSR (linear feedback shift register) capable of generating pseudo random numbers to invite random input from one of shift registers SR.

Alternatively, as shown in FIG. 17, it is easy and effective to use LFSR (linear feedback shift register) capable of generating pseudo-random numbers and randomly input from one of shift registers SR. In FIG. 17, NAND circuits are connected in two stages unlike FIG. 16. Their logical operation is the same as that of AND circuits and NOR circuits connected in two stages.

Principally, odd-numbered outputs are equal in value with each other, and even-numbered outputs are equal in value with each other. Even-numbered or odd-numbered outputs may be combined with the aforementioned equalizing circuit to obtain random numbers with higher quality.

SIXTH EMBODIMENT

Next explained is the sixth embodiment of the invention intended to reduce unevenness of between appearance frequencies of "0" and "1" by increasing NOR circuits (or NAND circuits) forming the flip-flops in the uncertain logic circuit 10 in a manner different from the fifth embodiment.

Figure 18A:
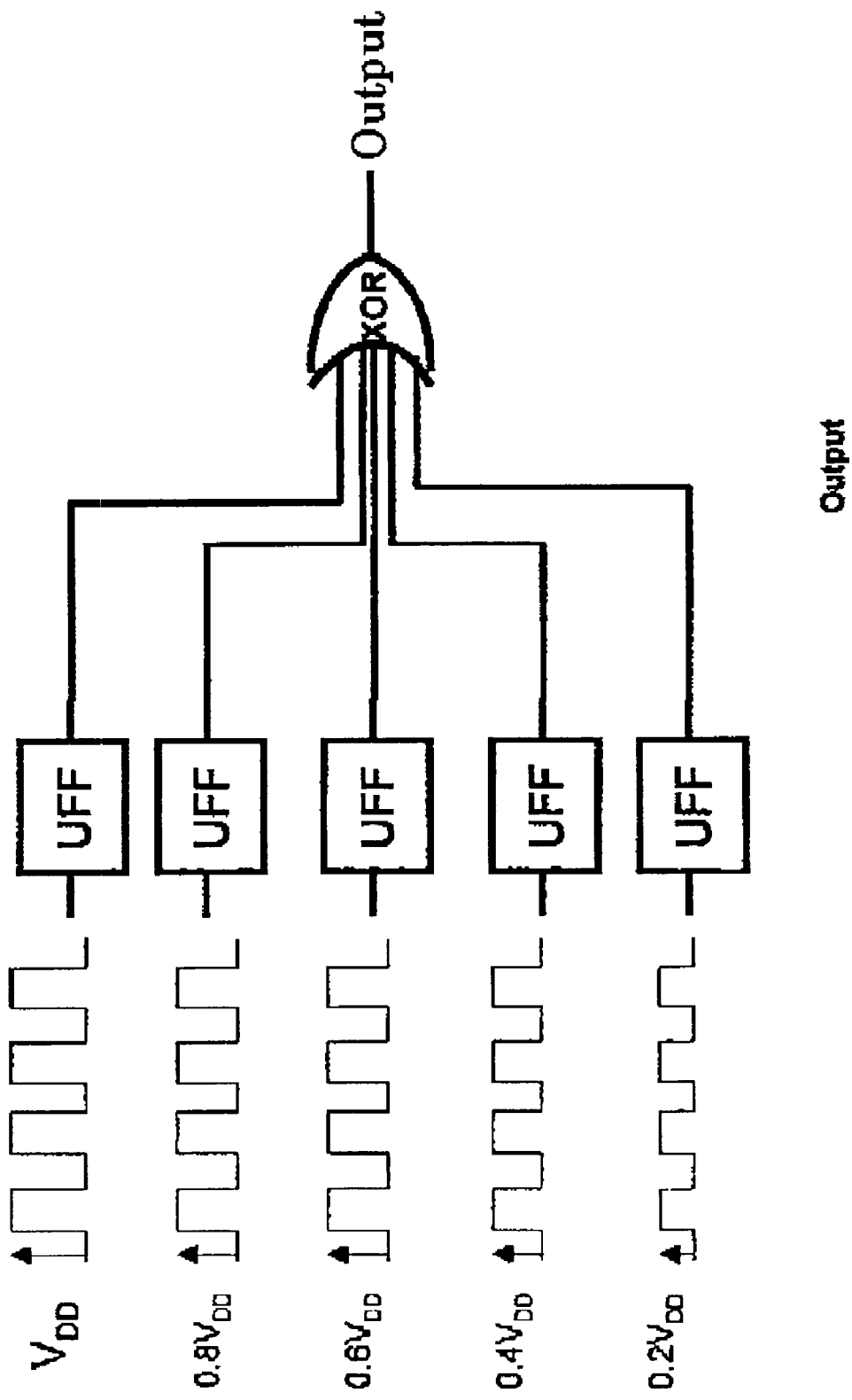
FIGS. 18A and 18B are schematic diagrams that show the substantial part of a circuit according to the sixth embodiment of the invention.
Figure 18B:
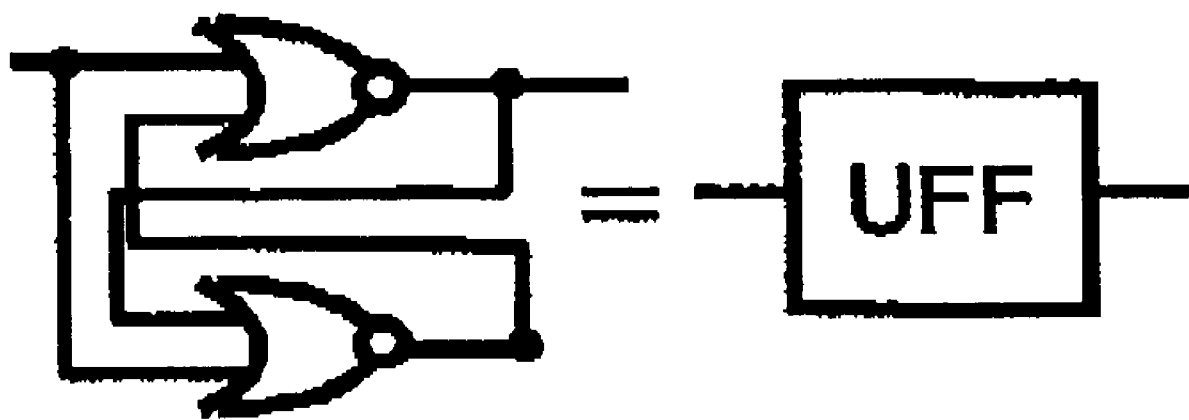

FIGS. 18A and 18B are schematic diagrams that show the substantial part of the circuit according to this embodiment. FIG. 18A shows a specific example using five UFFs (unsettable flip-flops) to make up the circuit. As shown in FIG. 18B, each UFF may be an uncertain flip-flop made up of two NOR circuits.

Figure 19:
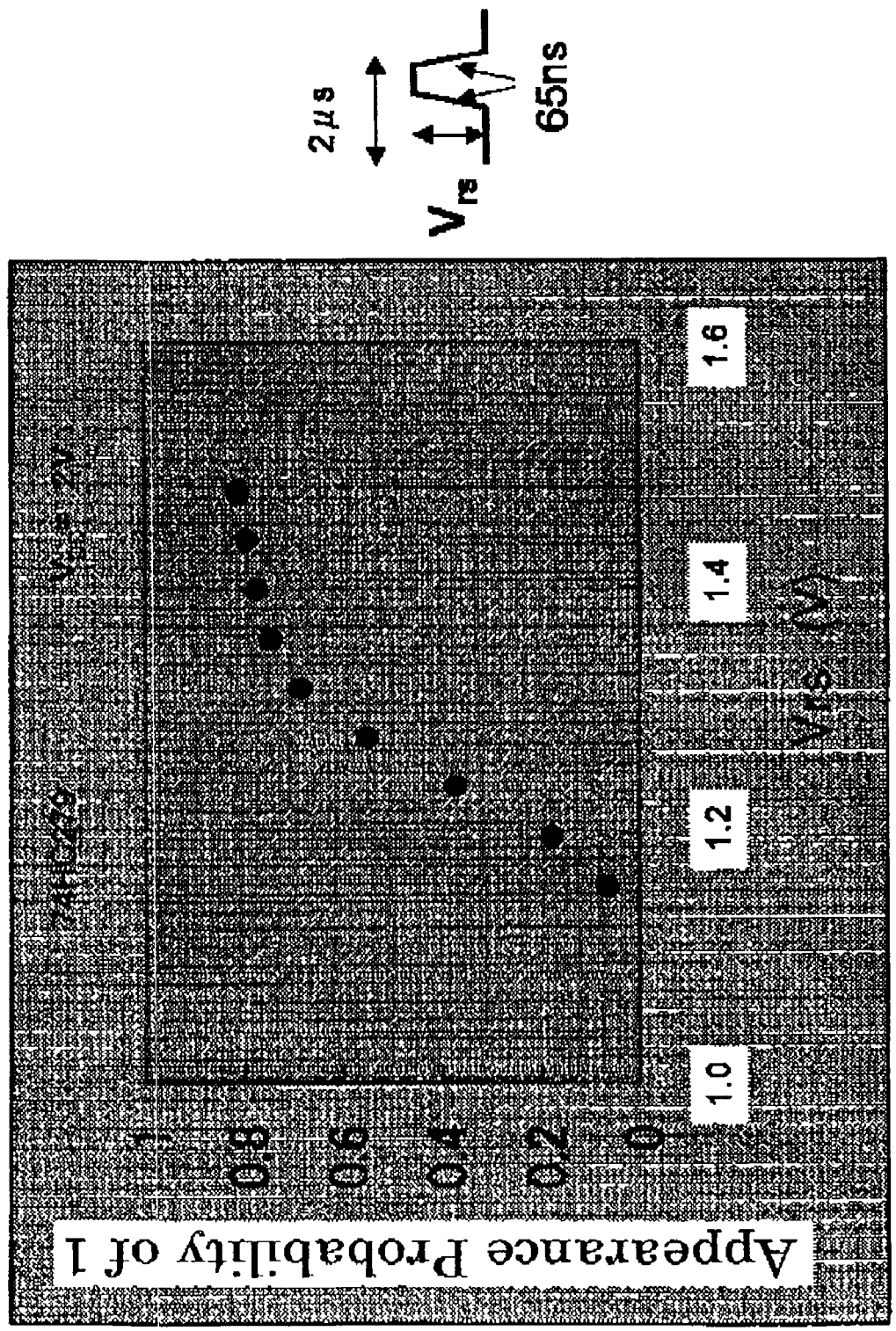
FIG. 19 is a graph illustrating dependency of the appearance probability of "1" upon a pulse voltage input to UFF.

In case of UFF, appearance frequency of "0" and "1" tends to depend upon the voltage level of the input pulse. That is, if the input pulse is lowered below the source voltage VDD as the reference of the digital circuit, UFF tends to exhibit higher or lower appearance frequency of "1" in the output. This is because the NOR circuits forming UFFs vary in threshold voltage, although slightly. FIG. 19 is a graph illustrating dependency of the appearance probability of "1" upon a pulse voltage input to UFF. That is, here is shown the appearance probability of "1" in UFF outputs when the period of the input pulses is 2 microseconds, the pulse width is 65 nanoseconds, and the pulse voltage Vrs is changed. Here is taken UFF connected to the source voltage VDD of 2 volts.

It will be appreciated from FIG. 19 that the appearance probability of "1" continuously increases as the pulse voltage Vrs rises. When the pulse voltage Vrs closely reaches 1.3 V, the appearance probability of "1" is approximately 0.5. That is, this level of pulse voltage substantially equalizes the appearance probabilities of "0" and "1" in UFF outputs.

Therefore, as shown in FIG. 18A, by introducing pulses different in voltage to a plurality of UFFs, an output with a small difference between appearance frequencies of "0" and "1" can be obtained from one or more of these UFFs.

In FIG. 18A, inputs to five UFFs are sequentially lowered from VDD to 20% of VDD. When XOR of outputs of five UFFs are operated, the difference between appearance frequencies of "0" and "1" in the XOR output is equivalent to or smaller than the smallest of the differences of appearance frequencies of "0" and "1" of those five UFFs. This principle is the same as that already explained as the XOR function of the equalizing circuit 20A shown in FIG. 9.

Although FIG. 18A shows the configuration using five UFFs, as the number of UFFs increases and their source voltages change more subtly, the effect of reducing the unevenness of appearance frequencies of "1" and "1" in the output is enhanced.

Heretofore, some embodiments of the invention have been explained in conjunction with their specific examples. The invention, however, is not limited to those specific examples.

For example, concrete configurations of the uncertain logic circuit and the equalizing circuit used in any of the embodiments of the invention are not limited to those specific examples, but the invention involves in its scope any modifications using any circuits for such function and operation.

For example, it is also effective to configure the random number generating circuit such that outputs of a logic circuit including a plurality of flip-flops uncertain in output, which are aligned in parallel or in series, are introduced to the logic circuit for equalizing appearance frequencies of "0" and "1", and this is also within the scope of the invention.

Further, among the above-explained embodiments, those that partly combine the digital circuit uncertain in output and the circuit for correcting frequencies in the digital output is also usable as the random number generating circuit, and they are also involved within in the scope of the invention.

Digital random numbers created by the random number generating circuit according to any embodiment of the invention can be used directly as random numbers, or can be used as the seed of a feedback shift register to create new random numbers.

As described above, according to embodiments of the invention, the random number generating circuit can be made of fewer logic gates to downsize the circuit by making use of a flip-flop type logic circuit, for example.

At the same time, the equalizing circuit for correcting appearance frequencies of "0" and "1" can be made of a relatively small-sized logic circuit.

Since the phenomenon as the source of random numbers is based on physical phenomena of elements forming the uncertain logic circuit, uncertain outputs are obtained in response to a single input value. Therefore, the random number sequence does not exhibit any periodicity, and it is possible to obtain high-quality random numbers different from pseudo-random numbers from which random numbers can be presumed.

Moreover, when a signal containing "0" and "1" alternately aligned at the same timings as outputs of the uncertain logic circuit is generated by means of T-type flip-flops by branching a clock signal of a constant period, and exclusive OR of this signal and output signals of the uncertain logic circuit is operated, the operation output T can be used as a digital random number sequence naturally having equal appearance probabilities of "0" and "1" and high randomness.

That is, the invention has a large industrial advantage in that it realizes random numbers having high randomness by using a compact and inexpensive circuit and thereby enables application to IC cards, for example, to realize an economical card system reliable in security.

While the present invention has been disclosed in terms of the embodiment in order to facilitate better understanding thereof, it should be appreciated that the invention can be embodied in various ways without departing from the principle of the invention. Therefore, the invention should be understood to include all possible embodiments and modification to the shown embodiments which can be embodied without departing from the principle of the invention as set forth in the appended claims.

What is claimed is:

1. A random number generating circuit comprising:
   an uncertain logic circuit including a flip-flop logic circuit which provides digital output values not definitely determined by a digital input value; and
   an equalizing circuit which equalizes appearance frequencies of "0" and "1" in said digital output values from said uncertain logic circuit;
   wherein said uncertain logic circuit includes at least four NOR circuits or NAND circuits that are in chain connection with output of each of said NOR or NAND circuits being connected to one of inputs of next NOR or NAND circuit.

2. A random number generating circuit according to claim 1, wherein said equalizing circuit includes a circuit for operating exclusive OR by using said digital output value from said uncertain logic circuit.

3. A random number generating circuit according to claim 2, wherein said flip-flop logic circuit is an RS flip-flop, and wherein said uncertain logic circuit alternately introduce a combination of input data for obtaining the value maintaining the preceding state and a combination of input data causing invalidation of the flip-flop to continuously make the output from said RS flip-flop uncertain.

4. A random number generating circuit according to claim 2, wherein said equalizing circuit operates exclusive OR of a plurality of digital signals output from said uncertain logic circuit, and outputs it as random numbers.

5. A random number generating circuit according to claim 2, wherein said equalizing circuit operates exclusive OR of a digital signal sequence containing "0" and "1" by 1:1 in appearance digital signal sequence output from said uncertain logic circuit, and outputs it as a digital random number sequence.

6. A random number generating circuit according to claim 1, wherein the number of said at least four NOR or NAND circuits is an even number.

7. A random number generating circuit according to claim 6, wherein uncertain outputs obtained by alternately introducing "1" and "0" to individual inputs of said NOR circuits or NAND circuits to form said digital output values are not determined definitely.

8. A random number generating circuit according to claim 7, wherein outputs from even-numbered or odd-numbered ones of said NOR circuits or NAND circuits are employed as said digital output values.

9. A random number generating circuit according to claim 6, wherein said digital output values not determined definitely are created by using uncertain outputs which are obtained by first introducing arbitrary data to inputs of said NOR circuits in chain connection and subsequently introducing "0" to all said inputs.

10. A random number generating circuit according to claim 9, wherein said arbitrary data is created by digitizing outputs from a plurality of asynchronous oscillator circuits.

11. A random number generating circuit according to claim 10, wherein said asynchronous oscillator circuits are different in oscillating frequency from each other.

12. A random number generating circuit according to claim 9, wherein said arbitrary data is obtained by combining outputs from arbitrary shift registers forming a feedback shift register.

13. A random number generating circuit according to claim 6, wherein said digital output values not determined definitely are created by using uncertain outputs which are obtained by first introducing arbitrary data to inputs of said NAND circuits in chain connection and subsequently introducing "1" to all said inputs.

14. A random number generating circuit comprising:
   an uncertain logic circuit including a flip-flop logic circuit which provides digital output values not definitely determined by a digital input value; and
   an equalizing circuit which equalizes appearance frequencies of "0" and "1" in said digital output values from said uncertain logic circuit,
   wherein said equalizing circuit includes a circuit configured to operate exclusive OR by using said digital output value from said uncertain logic circuit, and
   said uncertain logic circuit alternately repeats a phase for turning OFF a power source of said flip-flop logic circuit over a length of time enough to substantially erase information concerning preceding state of said flip-flop logic circuit and a phase for turning ON said power source of said flip-flop logic circuit, while continuously giving an input signal for holding output of said flip-flop logic circuit at a value maintaining the preceding state, thereby causing said flip-flop logic circuit to output an uncertain digital signal sequence.

15. A random number generating circuit comprising:
an uncertain logic circuit including a flip-flop logic circuit which provides digital output values not definitely determined by a digital input value; and
an equalizing circuit which equalizes appearance frequencies of "0" and "1" in said digital output values from said uncertain logic circuit,
wherein said uncertain logic circuit includes a plurality of RS-flip-flops, and generates said digital output values by supplying said flip-flops with pulse voltages different in size relative to each other and using outputs from said flip-flops.

16. A random number generating circuit according to claim 15, wherein said uncertain logic circuit provides exclusive OR of outputs from said plurality of flip-flops as said digital output values.

17. A random number generating circuit comprising:
an uncertain logic circuit including a flip-flop logic circuit which provides digital output values not definitely determined by a digital input value; and
an equalizing circuit which equalizes appearance frequencies of "0" and "1" in said digital output values from said uncertain logic circuit,
wherein said equalizing circuit includes:
a count circuit which counts appearance frequencies of "0" and "1" output from said flip-flop logic circuit; and
a feedback circuit which gives a feedback signal based on appearance frequencies counted by said count circuit to said flip-flop logic circuit.

18. A random number generating circuit according to claim 17, wherein said uncertain logic circuit alternately repeats a phase for turning OFF a power source of said flip-flop logic circuit over a length of time enough to substantially erase information concerning the preceding state of said flip-flop logic circuit and a phase for turning ON said power source of said flip-flop logic circuit, while continuously giving an input signal for holding the output of said flip-flop type logic circuit at a value maintaining the preceding state, thereby causing said flip-flop logic circuit to output an uncertain digital signal sequence.

19. A random number generating circuit according to claim 17, wherein said flip-flop logic circuit is an RS flip-flop, and wherein said uncertain logic circuit alternately introduces a combination of input data for obtaining the value maintaining the preceding state and a combination of input data causing invalidation of the flip-flop to continuously make the output from said RS flip-flop uncertain.

* * * * *